(12) United States Patent
Aines et al.

(10) Patent No.: US 9,879,175 B2
(45) Date of Patent: *Jan. 30, 2018

(54) ENCAPSULATED PROPPANTS

(71) Applicant: LAWRENCE LIVERMORE NATIONAL SECURITY, LLC, Livermore, CA (US)

(72) Inventors: Roger D. Aines, Livermore, CA (US); William L. Bourcier, Livermore, CA (US); Eric B. Duoss, Dublin, CA (US); Jeffery James Roberts, Livermore, CA (US); Christopher M. Spadaccini, Oakland, CA (US); Joshuah K. Stolaroff, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/001,590

(22) Filed: Jan. 20, 2016

(65) Prior Publication Data

US 2016/0145488 A1 May 26, 2016

Related U.S. Application Data

(62) Division of application No. 14/148,602, filed on Jan. 6, 2014.

(60) Provisional application No. 61/781,789, filed on Mar. 14, 2013.

(51) Int. Cl.
| | |
|---|---|
| *E21B 43/26* | (2006.01) |
| *E21B 43/267* | (2006.01) |
| *C09K 8/80* | (2006.01) |
| *C09K 8/70* | (2006.01) |

(52) U.S. Cl.
CPC ............ *C09K 8/805* (2013.01); *C09K 8/70* (2013.01); *E21B 43/26* (2013.01); *E21B 43/267* (2013.01)

(58) Field of Classification Search
CPC ........... C09K 8/805; C09K 8/70; E21B 43/26; E21B 43/267
See application file for complete search history.

(56) References Cited

U.S. PATENT DOCUMENTS

| | | | | |
|---|---|---|---|---|
| 4,078,610 | A * | 3/1978 | Arnold | E21B 43/24 166/280.1 |
| 5,373,901 | A * | 12/1994 | Norman | C09K 8/706 166/300 |
| 5,921,317 | A | 7/1999 | Dewprashad et al. | |
| 6,444,316 | B1 | 9/2002 | Reddy et al. | |
| 6,780,507 | B2 | 8/2004 | Toreki et al. | |
| 7,044,224 | B2 * | 5/2006 | Nguyen | C09K 8/665 106/600 |

(Continued)

*Primary Examiner* — Silvana Runyan
(74) *Attorney, Agent, or Firm* — Eddie E. Scott

(57) ABSTRACT

A capsule for carrying a proppant for emplaced in a formation containing formation fluid by a hydraulic fracture operation using a fracturing fluid. The capsule includes a capsule body. The capsule body includes a proppant. There is a surface layer on the capsule body that is permeable to the formation fluid or the fracturing fluid or is permeable to both the formation fluid and the fracturing fluid. The proppant material is dry cement that interacts with the formation fluid or the fracturing fluid or both the formation fluid and the fracturing fluid that migrate through the surface layer and is taken up by the dry cement causing the dry cement to harden.

4 Claims, 5 Drawing Sheets

(56) References Cited

U.S. PATENT DOCUMENTS

| | | |
|---|---|---|
| 7,861,780 B2 | 1/2011 | Stephenson et al. |
| 2005/0006095 A1 | 1/2005 | Justus et al. |
| 2005/0194141 A1 | 9/2005 | Sinclair et al. |
| 2006/0052251 A1 | 3/2006 | Anderson et al. |
| 2007/0166541 A1* | 7/2007 | Smith .................. C04B 18/082 428/402 |
| 2007/0209794 A1* | 9/2007 | Kaufman ................ C09K 8/50 166/276 |
| 2009/0124522 A1 | 5/2009 | Roddy |
| 2009/0139719 A1* | 6/2009 | Luo ...................... C04B 18/021 166/280.2 |

\* cited by examiner

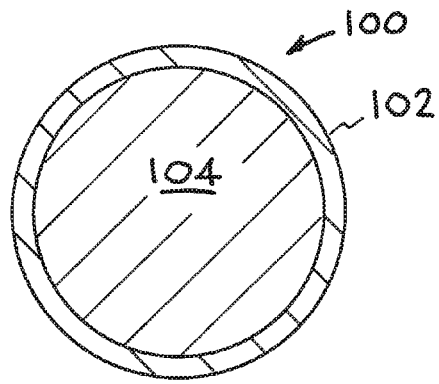 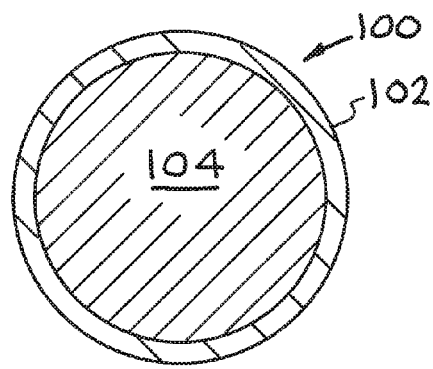
FIG. 1A  FIG. 1B
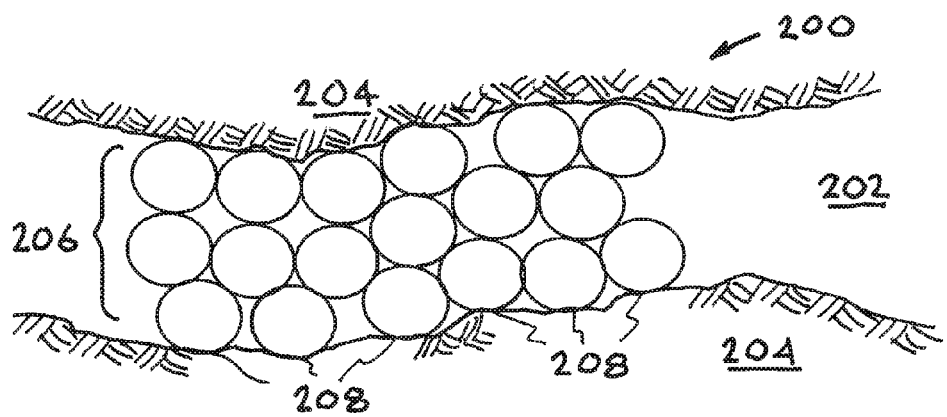
FIG. 2A
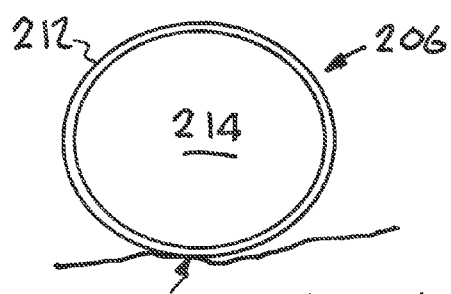
FIG. 2B

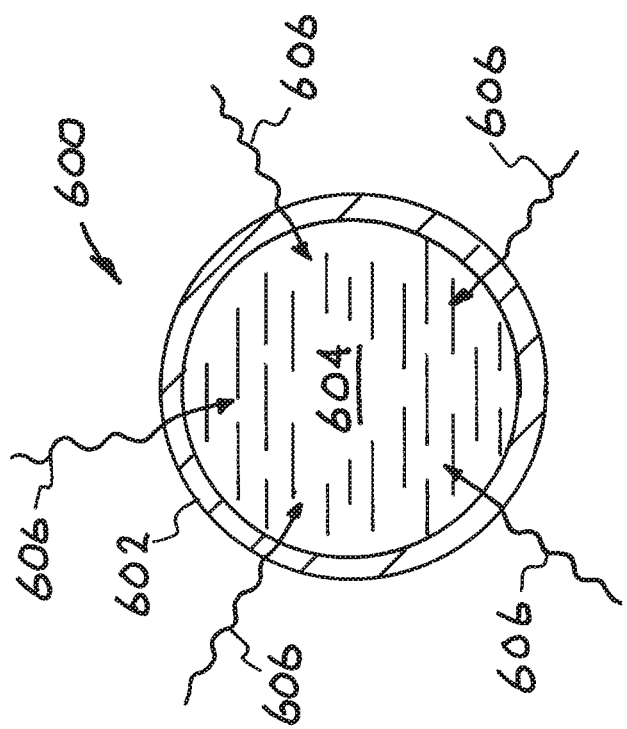
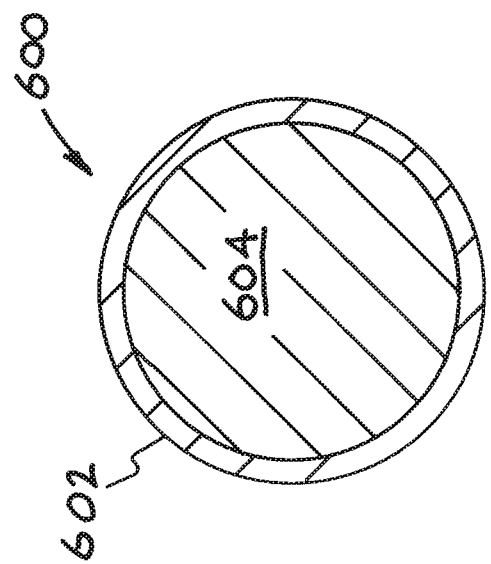
FIG. 6A
FIG. 6B

ENCAPSULATED PROPPANTS

CROSS-REFERENCE TO RELATED APPLICATIONS

The present application is a Division of application Ser. No. 14/148,602 filed Jan. 6, 2014, which claims benefit under 35 U.S.C. §119(e) of U.S. Provisional Patent Application No. 61/781,789 filed Mar. 14, 2013 entitled "Encapsulate Proppants," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to proppants for hydraulic fracturing and more particularly to encapsulated proppants for hydraulic fracturing.

State of Technology

Hydrofracturing for oil, gas, and geothermal recovery is in wide use particularly for low permeability reservoirs such as shales. In these cases, large hydraulic pressure is applied to a rock to cause a fracture to penetrate the rock, allowing access to extract the heat, oil, or gas. The fracture typically would close on it's own after the release of the hydraulic pressure pulse, and must be "propped" with a granular material that holds the fracture open.

The transport of proppant to the relatively small fracture is a key issue in designing hydraulic fractures. The proppant must fill the fracture (appropriately sized), it must hold the fracture open (strong enough), and it must not generate additional fine material either through damaging the rock, or by breaking down itself (the fine material can block flow). These properties typically require material such as very-well-rounded sand, epoxy coated sands, or even sintered ceramics to be used as proppant. All of these materials, however, are relatively dense, and typically get more dense as more strength is required. That density requires the fracturing fluid to be very viscous in order to transport the proppant completely into the fracture, and typically a considerable excess of water is used to fully drive the proppant to the fracture limits. The highly altered chemistry (for viscosity) and the excess amounts lead to increased expense in fracturing operations, and cause many of the observed environmental issues in shale gas fracturing operations.

Applicants have develop technology for carbon dioxide capture that encapsulates a reactive chemical (in that case a solvent) within a permeable polymer shell that keeps the reactive chemical encapsulated, while permitting some reactants (water and carbon dioxide) to pass through and enter the solvent. The present invention uses that same basic technology to encapsulate the reactive chemicals for creating a strong proppant, keeping them from reacting until the appropriate time. The silicone-based capsules already tested will be appropriate for proppant use, as they are strong, non-reactive, and allow water permeation required to initiate hardening of the reactive proppant precursors carried inside.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides improved proppants for hydraulic fracturing in oil, gas, and geothermal operations created by encapsulating reactive materials such as cements in a polymer casing designed to allow water to enter the capsule after a defined length of time or upon temperature increase. In a preferred embodiment the capsule is typically 0.5 to 2 mm in diameter, similar in size to current proppant materials.

In one embodiment, the present invention provides a capsule for carrying a proppant for emplacement in a formation containing a formation fluid by a hydraulic fracture operation using a fracturing fluid. The capsule includes a capsule body. The capsule body includes a proppant. There is a surface layer on the capsule body that is permeable to the formation fluid or the fracturing fluid or is permeable to both the formation fluid and the fracturing fluid. In one embodiment, the proppant material is dry cement that interacts with the formation fluid or the fracturing fluid or both the formation fluid and the fracturing fluid that migrate through the surface layer and is taken up by the dry cement causing the dry cement to harden.

Advantages of the present invention include, the ability for the encapsulated proppant to expand upon reaction, allowing more complete propping of the fracture. The density of proppant capsules can also be adjusted both by material choice, and by deliberate addition of void space within the capsule. Lower density proppant permits much wider choice of fracturing fluid chemistries, use of less fracturing water, and easier reuse or recycling of fracturing water by reducing the need to add viscosifiers to the water.

Capsules can be made any size as fitted to formation and fracture. Reaction rate can be adjusted by polymer choice, granularity of reactive material, or polymer thickness. Reactive material such as cements may be solid, powdered solid, powder in a liquid such as alcohol, or reactive liquids; or combinations of those. Cements typically used for well construction can be used to ensure appropriate properties. The present invention has many uses, for example the present invention has use in hydraulic fracturing for enhanced oil, gas and geothermal recovery and shale gas fracturing.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

FIGS. 1A and 1B illustrate one embodiment of the encapsulated proppant of the present invention.

FIGS. 2A and 2B show the encapsulated proppants of the present invention positioned in a fracture.

FIGS. 6A and 6B are additional illustrations that show additional features of the invention.

DETAILED DESCRIPTION OF SPECIFIC EMBODIMENTS

Figure 3A:
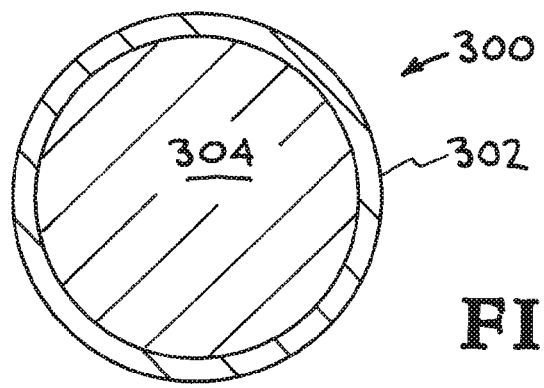
FIGS. 3A, 3B, and 3C illustrate another embodiment of the encapsulated proppant of the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The present invention provides encapsulation to carry a package of chemicals as it is emplaced during a hydraulic fracture operation and the creation and maintenance of a fracture. The encapsulated package of chemicals reacts, either due to time passing and the diffusion of water through the polymer shell, or the presence of heat at depth in the earth.

Some of the major advantages of the present invention over conventional packages of chemicals for fracturing are: (1) the ability to adjust the density of the proppant of the present invention to improve fracturing fluid composition and maximize proppant placement with minimum water usage; (2) expansion of the proppant during emplacement to improve fracture opening; (3) adaptation of the shape of the proppant during hardening to the shape of the formation it touches, maximizing footprint and minimizing formation damage; and (4) the ability to adjust the exterior coat of the capsule to improve interactions with the hydrofracturing fluid and minimize reactions with the formation rock.

Referring now to the drawings and in particular to FIGS. 1A and 1B one embodiment of the encapsulated proppant of the present invention is illustrated. The encapsulated proppant is designated generally by the reference numeral 100. The encapsulated proppant 100 includes a capsule body 104 with a surface layer 102 on the capsule body 104. FIG. 1A illustrates the encapsulated proppant 100 prior to its introduction into the formation during a hydraulic fracturing operation. FIG. 1B illustrates the encapsulated proppant 100 after its introduction into the formation during a hydraulic fracturing operation.

As shown in FIG. 1A the surface layer 102 can be a polymer shell, for example silicone or norton optical adhesive. The capsule body 104 can be dry premixed cement. In one embodiment the capsule body 104 constitutes a reactive material that is held inside a slightly elastic polymer shell 102. Diffusion of water through the shell 102 initiates and/or completes the reaction of the material 104 to form a hard, strong proppant sphere. In use in hydrofracturing the polymer shell 102 can deform as the inside material hardens minimizing damage to the formation as the walls of the fracture close on the proppant spheres.

Referring now to FIG. 1B, the encapsulated proppant 100 is illustrated after its introduction into the formation during a hydraulic fracturing operation. The polymer shell 102 is still largely intact. The cement 104 has hardened through reaction with water (the formation fluid or the fracturing fluid or both the formation fluid and the fracturing fluid) diffusing through the polymer shell 102. The cement 104 continues to harden with time. The reaction rate is designed through control of dry chemistry and polymer shell properties.

The structure of the encapsulated proppant 100 having been described, the making of the encapsulated proppant 100 will now be considered. A typical way to create them is to encapsulate a cement used for wellbore construction, and whose properties are well known as a function of pressure, temperature, and water chemistry. These cements are typically in powdered form, so it may be necessary to suspend them in a sacrificial liquid during the encapsulation process. A volatile organic fluid such as an alcohol (methanol, ethanol for instance) could be used for this purpose. The sacrificial liquid would then be evaporated through the capsule wall in a preparation step prior to use of the proppant. The final version would have little or no liquid remaining inside, with mostly dry cement powder and some residual liquid.

Other forms of reactive material 104 could be used inside the capsules 100, provided they harden by reaction with water. This is necessary in order to add mass to the proppant as it reacts, allowing additional strength and volume without the burden of carrying all of the necessary chemicals inside the capsule. By only having some of the components of the final reacted proppant within the original capsule, the overall size and density of the capsule can be limited. This improves the placement of the proppant and permits less total water usage in hydrofracturing. Some forms of liquid cement could be used as well. Reactive material that reacts with water and foams slightly as it hardens, such as polyurethane glue (diphenylmethane diisocyanate) can permit an increase in volume while retaining most of the material's strength.

Referring now to FIGS. 2A and 2B an illustration shows the encapsulated proppants of the present invention positioned in a fracture. The encapsulated proppants in the fracture are designated generally by the reference numeral 200.

As illustrated in FIG. 2A, the individual encapsulated proppants 206 are introduced into the formation 204 during a hydraulic fracturing operation and lodged in a fracture 202. The fracture 202 closes and contacts the capsules 206 with a minor deformation in the formation 204. The deformation is illustrated by the reference numeral 208.

Referring now to FIG. 2B, one of the individual encapsulated proppants 206 after the fracture 202 closes and contacts the capsules 206 with the polymer shell 212 slightly deformed as designated by the arrow 210. The polymer shell 202 is still largely intact. The cement 214 has hardened through reaction with water (the formation fluid or the fracturing fluid or both the formation fluid and the fracturing fluid) diffusing through the polymer shell 202. The cement 214 continues to harden with time. The reaction rate is designed through control of dry chemistry and polymer shell properties. There has been no creation of fines due to encapsulation of the cement 214 and the relatively soft polymer shell 212 has deforming slightly.

Figure 3B:
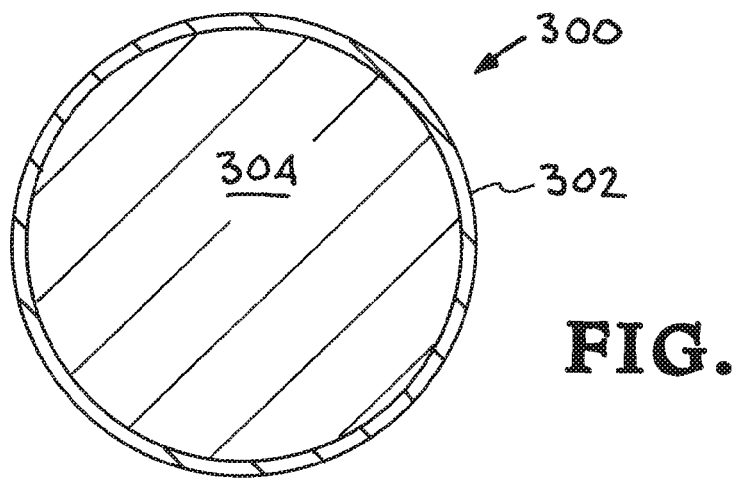
Figure 3C:
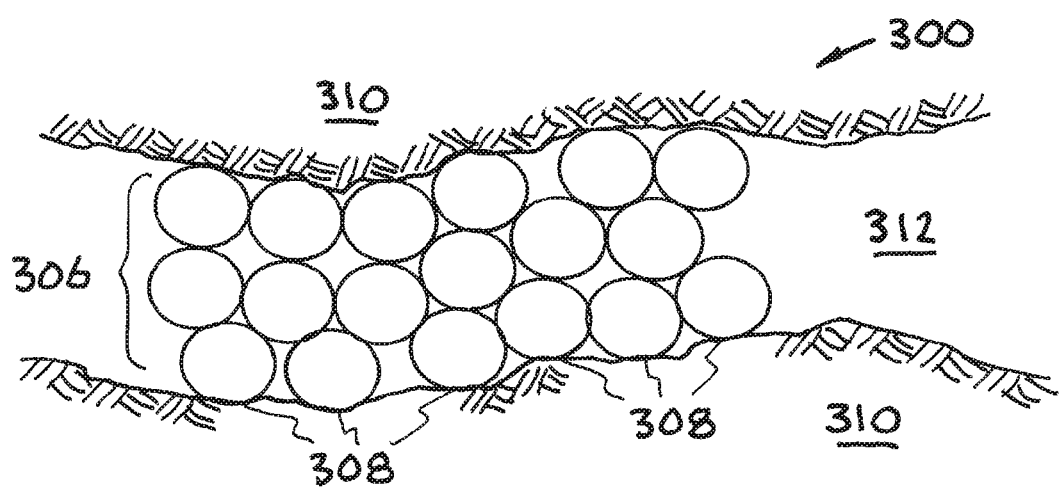

Referring now to FIGS. 3A, 3B, and 3C another embodiment of the encapsulated proppant of the present invention is illustrated. This embodiment of the encapsulated proppant of the present invention provides an expanding reactive proppant. The encapsulated expanding reactive proppant is designated generally by the reference numeral 300. The expanding reactive proppant proppant 300 includes a capsule body 304 with a surface layer 302 on the capsule body 304. FIG. 3A illustrates the encapsulated expanding reactive proppant 300 prior to its introduction into the formation during a hydraulic fracturing operation. FIG. 3B illustrates the encapsulated expanding reactive proppant 300 after its introduction into the formation during a hydraulic fracturing operation.

As shown in FIG. 3A the surface layer 302 can be a polymer shell, for example silicone or norton optical adhesive. The capsule body 304 can be dry premixed cement with expanding properties. In one embodiment the capsule body 304 constitutes a reactive material that is held inside a slightly elastic polymer shell 302. Diffusion of water through the shell 302 initiates and/or completes the reaction of the material 304 to form a hard, strong, expanded proppant sphere. In use in hydrofracturing the polymer shell 302 can deform as the inside material hardens minimizing damage to the formation as the walls of the fracture close on the proppant spheres.

Referring now to FIG. 3B, the encapsulated proppant 300 is illustrated after its introduction into the formation during a hydraulic fracturing operation. The capsule body 304 has an overall volume increased by up to 50%. The polymer shell 302 is still largely intact but has thinned. The cement 304 has hardened through reaction with water (the formation fluid or the fracturing fluid or both the formation fluid and the fracturing fluid) diffusing through the polymer shell 302. The cement 304 continues to harden with time. The reaction rate is designed through control of dry chemistry and polymer shell properties. The additional mass and volume in the capsule body 302 has come through reaction with water (the formation fluid or the fracturing fluid or both the formation fluid and the fracturing fluid) diffusing through the polymer shell 302.

Referring now to FIG. 3C, the expanding reactive proppants 306 are shown in place in the fracture 312 in the formation 310. The encapsulated expanding reactive proppants 306 are shown after the fracture 312 closes and contacts the capsules 306 with the polymer shell 302 slightly deformed. The deformation is illustrated by the reference numeral 308. The capsules 312 have expanded to meet the fracture 312 at maximum width during fracture formation. The capsules 312 "barrel" slightly as they expand and harden, increasing contact footprint and decreasing formation damage. A smaller total proppant count in the fracture 312 keeps permeability high. The polymer shells 302 are still largely intact. The cement 306 has hardened through reaction with water (the formation fluid or the fracturing fluid or both the formation fluid and the fracturing fluid) diffusing through the polymer shell 302. The cement 306 continues to harden with time. The reaction rate is designed through control of dry chemistry and polymer shell properties.

Figure 4A:
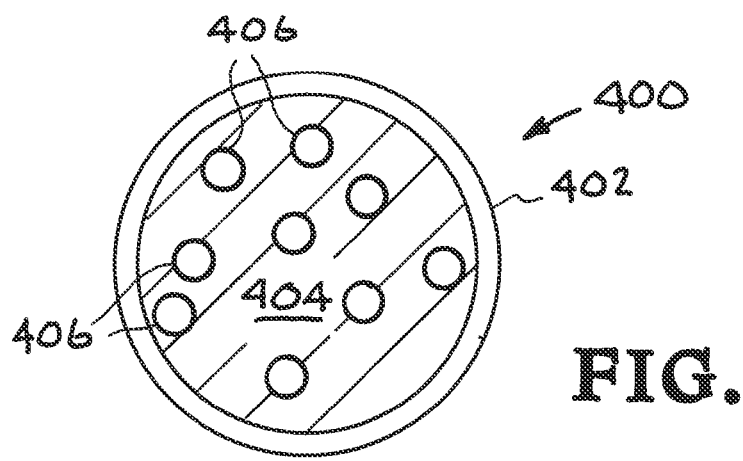
FIGS. 4A, 4B, and 4C illustrate yet another embodiment of the encapsulated proppant of the present invention.
Figure 4B:
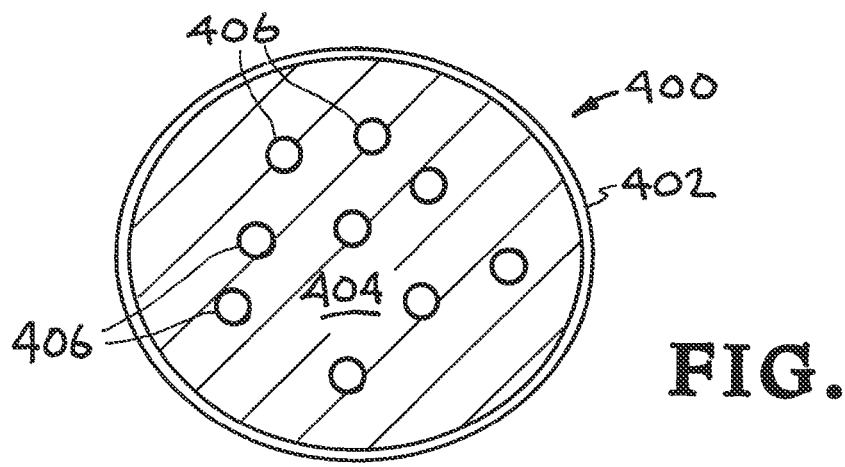
Figure 4C:
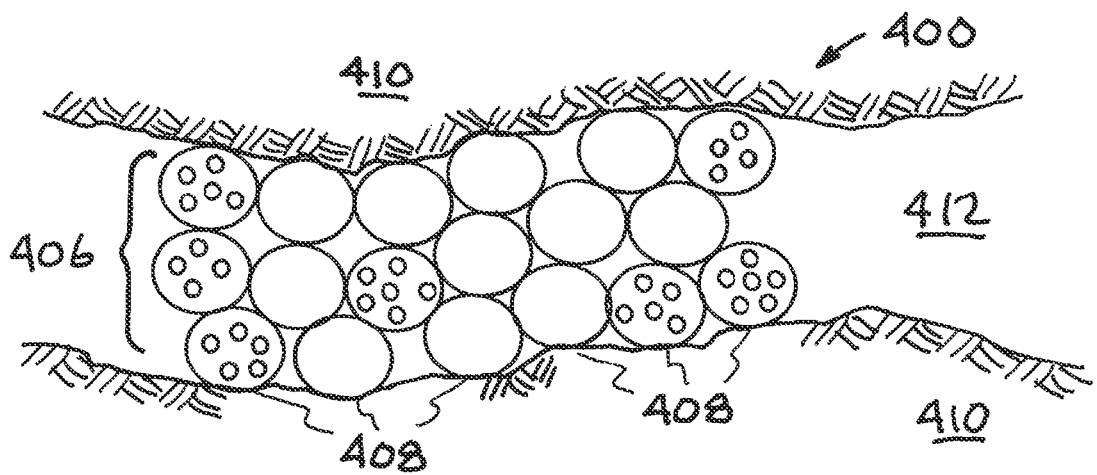

Referring now to FIGS. 4A, 4B, and 4C another embodiment of the encapsulated proppant of the present invention is illustrated. This embodiment of the encapsulated proppant of the present invention provides an expanding reactive proppant containing hollow vesicles. The encapsulated expanding reactive proppant is designated generally by the reference numeral 400. The expanding reactive proppant 400 includes a capsule body 404 with a surface layer 402 on the capsule body 404. FIG. 4A illustrates the encapsulated expanding reactive proppant 400 prior to its introduction into the formation during a hydraulic fracturing operation. FIGS. 4B and 4C illustrate the encapsulated expanding reactive proppants 400 after their introduction into the formation during a hydraulic fracturing operation.

As shown in FIG. 4A the surface layer 402 can be a polymer shell, for example silicone or norton optical adhesive. The capsule body 404 can be dry premixed cement with expanding properties. Hollow vesicles 406 are contained in the dry premixed cement. The hollow vesicles 406 are similar to the outside polymer shell 402. The Bulk density is reduced by the volume of the hollow vesicles. In one embodiment the capsule body 404 constitutes a reactive material that is held inside a slightly elastic polymer shell 402. Diffusion of water through the shell 402 initiates and/or completes the reaction of the material 404 to form a hard, strong, expanded proppant sphere. In use in hydrofracturing the polymer shell 402 can deform as the inside material hardens minimizing damage to the formation as the walls of the fracture close on the proppant spheres.

Referring now to FIG. 4B, the encapsulated proppant 400 is illustrated after its introduction into the formation during a hydraulic fracturing operation. The capsule body 404 has an overall volume increased by up to 50%. The polymer shell 402 is still largely intact but has thinned. The internal hollow vesicles 406 are intact but have decreased in size. The cement 404 has hardened through reaction with water (the formation fluid or the fracturing fluid or both the formation fluid and the fracturing fluid) diffusing through the polymer shell 402. The hardened proppant 400 maintains full strength due to the spherical shape of the hollow vesicles 406. The cement 404 continues to harden with time. The reaction rate is designed through control of dry chemistry and polymer shell properties. The additional mass and volume in the capsule body 402 has come through reaction with water (the formation fluid or the fracturing fluid or both the formation fluid and the fracturing fluid) diffusing through the polymer shell 402.

Referring now to FIG. 4C, the lower density proppants 406 are shown in place in the fracture 412 in the formation 310. The behavior of the lower density proppants 406 after emplacement is similar to the normal density proppants; however, the lower density proppants 406 are much easier to place into the fracture 412 due to lowered density. The encapsulated lower density proppants 406 are shown after the fracture 402 closes and contacts the capsules 406 with the polymer shell 408 slightly deformed. The deformation is illustrated by the reference numeral 408. The capsules 406 have expanded to meet the fracture 412 at maximum width during fracture formation. The capsules 406 "barrel" slightly as they expand and harden, increasing contact footprint and decreasing formation damage. A smaller total proppant count in the fracture 412 keeps permeability high. The polymer shells 402 are still largely intact. The cement 406 has hardened through reaction with water (the formation fluid or the fracturing fluid or both the formation fluid and the fracturing fluid) diffusing through the polymer shell 408. The cement 406 continues to harden with time. The reaction rate is designed through control of dry chemistry and polymer shell properties.

Figure 5:
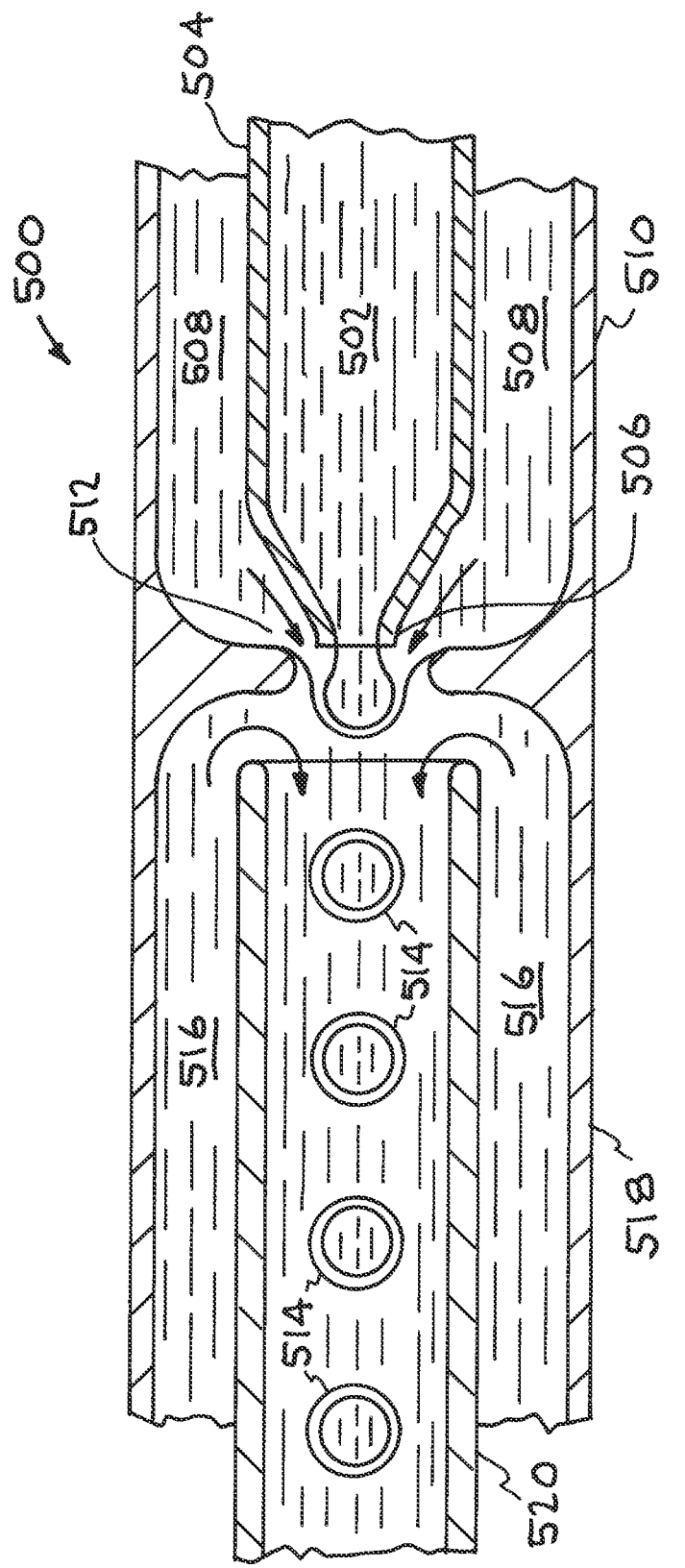
FIG. 5 illustrates a capsule making system.

Referring now to FIG. 5 a system for making microcapsules containing proppant material is illustrated. The system for making encapsulated proppant material is designated generally by the reference numeral 500. The schematically illustrated system 500 includes the following items: an injection tube 504, a collection tube 520, and an outer tube 518.

In operation the inner fluid 502 flows in the injection tube 504. As this fluid 502 proceeds it passes thru a droplet forming nozzle 506 at the end of injection tube 504 within the end portion 510 of the outer tube 518. The formed droplet 514 is released from the nozzle and becomes encased in the middle fluid 516, the middle fluid 516 is flowing in the direction indicated by the arrows 512. The droplet 514 in the middle fluid 516 becomes encased in fluid 508 forming encapsulated microcapsules 514 that have proppant material in a core with a thin outer shell. The above described method will produce encapsulated cement material of a controlled size enclosed in a shell.

Systems for producing microcapsules are described in U.S. Pat. No. 7,776,927 and in U.S. Published Patent Application Nos. 2009/0012187 and 2009/0131543. U.S. Pat. No. 7,776,927 to Liang-Yin Chu et al, assigned to the President and Fellows of Harvard College, discloses emulsions and the production of emulsions, including multiple emulsions and microfluidic systems for producing multiple emulsions. A multiple emulsion generally describes larger droplets that contain one or more smaller droplets therein which, in some cases, can contain even smaller droplets therein, etc. Emulsions, including multiple emulsions, can be formed in certain embodiments with generally precise repeatability, and can be tailored to include any number of inner droplets, in any desired nesting arrangement, within a single outer droplet. In addition, in some aspects of the invention, one or more droplets may be controllably released from a surrounding droplet. U.S. Published Patent Application No. 2009/0012187 to Liang-Yin Chu et al, assigned to the President and Fellows of Harvard College, discloses multiple emulsions, and to methods and apparatuses for making emulsions, and techniques for using the same. A multiple emulsion generally describes larger droplets that contain one or more smaller droplets therein which, in some cases, can contain even smaller droplets therein, etc. Emulsions, including multiple emulsions, can be formed in certain embodiments with generally precise repeatability, and can be tailored to include any number of inner droplets, in any desired nesting arrangement, within a single outer droplet. In addition, in some aspects of the invention, one or more droplets may be controllably released from a surrounding droplet. U.S. Published Patent Application No. 2009/0131543 to David A. Weitz discloses multiple emulsions, and to methods and apparatuses for making multiple emulsions. A multiple emulsion, as used herein, describes larger droplets that contain one or more smaller droplets therein. The larger droplet or droplets may be suspended in a third fluid in some cases. In certain embodiments, emulsion degrees of nesting within the multiple emulsion are possible. For example, an emulsion may contain droplets containing smaller droplets therein, where at least some of the smaller droplets contain even smaller droplets therein, etc. Multiple emulsions can be useful for encapsulating species such as pharmaceutical agents, cells, chemicals, or the like. In some cases, one or more of the droplets (e.g., an inner droplet and/or an outer droplet) can change form, for instance, to become solidified to form a microcapsule, a lipo some, a polymero some, or a colloid some. As described below, multiple emulsions can be formed in one step in certain embodiments, with generally precise repeatability, and can be tailored to include one, two, three, or more inner droplets within a single outer droplet (which droplets may all be nested in some cases). As used herein, the term "fluid" generally means a material in a liquid or gaseous state. Fluids, however, may also contain solids, such as suspended or colloidal particles. U.S. Pat. No. 7,776,927 and U.S. Published Patent Application Nos. 2009/0012187 and 2009/0131543 are incorporated herein by this reference.

The present invention provides benefits in fabrication and manufacturability. The encapsulated cement material can be fabricated at a size small enough for efficient mass transfer and large enough for ease of handling. The present invention provides methods to fabricate cement material filled shells. The present invention provides benefits in survivability and robustness.

Referring now to FIGS. 6A and 6B additional illustrations of the encapsulated proppant of the present invention are provided to further illustrate the present invention. The additional illustrations of the proppant are designated generally by the reference numeral 600. The encapsulated proppant 600 includes a capsule body 604 with a surface layer 602 on the capsule body 604. FIG. 6A illustrates the encapsulated proppant 600 after its introduction into the formation during a hydraulic fracturing operation. FIG. 6B illustrates the encapsulated proppant 600 in the formation during a hydraulic fracturing operation.

As illustrated in FIG. 6A the surface layer 602 can be a polymer shell, for example silicone or norton optical adhesive. The capsule body 604 can be dry premixed cement. In one embodiment the capsule body 604 constitutes a reactive material that is held inside a slightly elastic polymer shell 602. Diffusion of water through the shell 602 as illustrated by the arrows 606 initiates and/or completes the reaction of the material 604 to form a hard, strong proppant sphere. In use in hydrofracturing the polymer shell 602 can deform as the inside material hardens minimizing damage to the formation as the walls of the fracture close on the proppant spheres.

As illustrated in FIG. 6B, the encapsulated proppant 600 is shown after its introduction into the formation during a hydraulic fracturing operation. The polymer shell 602 is still largely intact. The cement 604 has hardened through reaction with water (the formation fluid or the fracturing fluid or both the formation fluid and the fracturing fluid) diffusing through the polymer shell 602. The cement 604 continues to harden with time. The reaction rate is designed through control of dry chemistry and polymer shell properties.

Other forms of reactive material 604 could be used inside the capsule 600, provided they harden by reaction with water. This is necessary in order to add mass to the proppant as it reacts, allowing additional strength and volume without the burden of carrying all of the necessary chemicals inside the capsule. By only having some of the components of the final reacted proppant within the original capsule, the overall size and density of the capsule can be limited. This improves the placement of the proppant and permits less total water usage in hydrofracturing. Some forms of liquid cement could be used as well. Reactive material that reacts with water and foams slightly as it hardens, such as polyurethane glue (diphenylmethane diisocyanate) can permit an increase in volume while retaining most of the material's strength.

Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus that is introduced into a formation containing formation fluid during a hydraulic fracture operation wherein the hydraulic fracturing operation has a fracturing fluid wherein the formation has a fracture that closes after the hydraulic fracturing operation, comprising:
   a spherical capsule adapted to be positioned in the fracture and remain in the fracture when the fracture closes;
   said spherical capsule having a spherical capsule body,
   a spherical surface layer on said spherical capsule body wherein said spherical surface layer is a solid polymer shell made of a permeable polymer material that is permeable to the formation fluid or the fracturing fluid or is permeable to both the formation fluid and the fracturing fluid wherein said spherical permeable surface layer enables fluid to migrate through said spherical permeable surface layer, and
   wherein said permeable polymer material is an elastic polymer material that is adapted to deform when said spherical capsule is positioned in the fracture and remains in the fracture when the fracture closes;
   a proppant encapsulated within said spherical permeable surface layer, wherein said proppant is made of a dry premixed cement proppant material that interacts with the formation fluid or the fracturing fluid or both the formation fluid and the fracturing fluid that migrates through said spherical permeable surface layer and initiates a reaction with said dry premixed cement proppant material causing said proppant material to harden; and
   hollow vesicles encapsulated within said spherical permeable surface layer together with said dry premixed cement proppant material wherein said hollow vesicles are made of said elastic polymer material that is adapted to deform when said spherical capsule and said hollow vesicles are positioned in the fracture and remain in the fracture when the fracture closes.

2. The apparatus of claim 1 wherein said hollow vesicles have an outer portion made of said elastic polymer material and an inner hollow portion and wherein said hollow vesicles have an initial size when said hollow vesicles are positioned in the fracture and said hollow vesicles have a smaller size when the fracture closes.

3. The apparatus of claim 1 wherein said surface layer is made of silicone.

4. The apparatus of claim 1 wherein said dry premixed cement proppant material is adapted to harden when the formation fluid or the fracturing fluid or both the formation fluid and the fracturing fluid migrates through said spherical permeable surface layer and wherein said hollow vesicles within said proppant have an initial size when said hollow vesicles are positioned in the fracture and said hollow vesicles have a smaller size when the fracture closes.

* * * * *